United States Patent
Tano et al.

(10) Patent No.: US 10,359,754 B2
(45) Date of Patent: Jul. 23, 2019

(54) FUEL CELL SYSTEM AND METHOD OF CONTROLLING FUEL CELL

(71) Applicant: TOYOTA JIDOSHA KABUSHIKI KAISHA, Toyota-shi, Aichi-ken (JP)

(72) Inventors: Yutaka Tano, Toyota (JP); Mitsuhiro Nada, Toyota (JP); Tomohiko Kaneko, Toyota (JP); Yohei Okamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 727 days.

(21) Appl. No.: 14/922,458

(22) Filed: Oct. 26, 2015

(65) Prior Publication Data

US 2016/0132035 A1   May 12, 2016

(30) Foreign Application Priority Data

Nov. 12, 2014   (JP) .................................. 2014-229381

(51) Int. Cl.
  *G05B 19/048* (2006.01)
  *H01M 8/1018* (2016.01)
  (Continued)

(52) U.S. Cl.
  CPC ........ *G05B 19/048* (2013.01); *H01M 8/0488* (2013.01); *H01M 8/04089* (2013.01);
  (Continued)

(58) Field of Classification Search
  CPC ......... H01M 8/04089; H01M 8/04164; H01M 8/04559; H01M 8/04589; H01M 8/04619;
  (Continued)

(56) References Cited

U.S. PATENT DOCUMENTS 6,979,507 B2 * 12/2005 Edlund ............. H01M 8/04089
                                                  429/424
8,580,449 B2 * 11/2013 Naganuma ........ H01M 8/04089
                                                  429/432
(Continued)

FOREIGN PATENT DOCUMENTS

CN         1841823 A       10/2006
CN       102785584 A       11/2012
(Continued)

*Primary Examiner* — Gregg Cantelmo
(74) *Attorney, Agent, or Firm* — Finnegan, Henderson, Farabow, Garrett & Dunner, LLP

(57) ABSTRACT

A fuel cell system in which power generation is performed by a fuel cell, comprising: a power generation controller that performs: first control in which at least one of power control for preventing generated power from exceeding an upper limit value, voltage control for preventing generated voltage from falling below a lower limit value and current control for preventing generated current from exceeding an upper limit value is performed and second control in which the generated voltage is prevented from exceeding an upper limit value; and a priority instructor that instructs the power generation controller to prioritize the first control over the second control when the first control and the second control collide with each other.

10 Claims, 8 Drawing Sheets

(51) Int. Cl.
    *H01M 8/04089*     (2016.01)
    *H01M 8/04119*     (2016.01)
    *H01M 8/04537*     (2016.01)
    *H01M 8/04828*     (2016.01)
    *H01M 8/04858*     (2016.01)

(52) U.S. Cl.
    CPC ....... *H01M 8/0491* (2013.01); *H01M 8/0494* (2013.01); *H01M 8/04164* (2013.01); *H01M 8/04559* (2013.01); *H01M 8/04589* (2013.01); *H01M 8/04619* (2013.01); *G05B 2219/2639* (2013.01); *H01M 2008/1095* (2013.01)

(58) Field of Classification Search
    CPC ........ H01M 8/0494; H01M 2008/1095; G05B 19/048; G05B 2219/2639
    See application file for complete search history.

(56) References Cited

U.S. PATENT DOCUMENTS

| | | | |
|---|---|---|---|
| 2006/0182435 A1* | 8/2006 | Sugihara | G03B 7/26 396/277 |
| 2006/0222916 A1 | 10/2006 | Norimatsu et al. | |
| 2008/0138680 A1* | 6/2008 | Hu | H01M 8/0494 429/431 |
| 2008/0187790 A1* | 8/2008 | Kamihara | H01M 8/04231 429/429 |
| 2012/0121941 A1 | 5/2012 | Hasegawa et al. | |
| 2012/0292990 A1 | 11/2012 | Watanabe et al. | |

FOREIGN PATENT DOCUMENTS

| | | |
|---|---|---|
| JP | 2006-139972 | 6/2006 |
| JP | 2013-033611 | 2/2013 |
| WO | WO 2011/013213 | 2/2011 |

\* cited by examiner

Fig.8

| | MINIMUM VALUE | INTERMEDIATE VALUE | MAXIMUM VALUE | LOWER LIMIT VALUE | UPPER LIMIT VALUE | PRIORITY RULES APPLIED | |
|---|---|---|---|---|---|---|---|
| | | | | | | NON-PRIORITY | PRIORITY |
| (a) | Imin | ImaxA | ImaxB | Imin | ImaxA | NONE | |
| (b) | Imin | ImaxB | ImaxA | Imin | ImaxB | | |
| (c) | ImaxB | Imin | ImaxA | Imin | ImaxA | ImaxB | Imin |
| (d) | ImaxA | Imin | ImaxB | ImaxA | ImaxA | Imin | ImaxA |
| (e) | ImaxA | ImaxB | Imin | ImaxA | ImaxA | Imin | ImaxA |
| (f) | ImaxB | ImaxA | Imin | ImaxA | ImaxA | ImaxB | Imin |

FUEL CELL SYSTEM AND METHOD OF CONTROLLING FUEL CELL

CROSS-REFERENCE TO RELATED APPLICATIONS

This application claims priority based on Japanese Patent Application No. 2014-229381 filed on Nov. 12, 2014, and the entire disclosure of which is hereby incorporated by reference.

BACKGROUND

Field

The present invention relates to fuel cells.

Related Art

In order to control power generation performed by a fuel cell, a configuration in which a plurality of ECUs are incorporated is known. Each of these ECUs determines the target ranges of various types of physical quantities so as to perform control allocated to itself (JP2006-139972).

SUMMARY

In the conventional technology described above, sufficient consideration is not given to a case where not all the target ranges determined by the ECUs are satisfied and thus pieces of control collide with each other. Such a problem is common not only to the case where each of the ECUs performs control allocated but also to a case where these pieces of control are unified into one ECU. In view of the foregoing problem, the present invention provides a control method in a case where in the control of a fuel cell, pieces of control on various types of physical quantities collide with each other.

Solution to Problem

The present invention is made so as to solve the above problem, and can be realized as aspects below.

According to one aspect of the present invention, there is provided a fuel cell system in which power generation is performed by a fuel cell. The fuel cell system includes: a power generation controller that performs: first control in which at least one of power control for preventing generated power from exceeding an upper limit value, voltage control for preventing generated voltage from falling below a lower limit value and current control for preventing generated current from exceeding an upper limit value is performed and second control in which the generated voltage is prevented from exceeding an upper limit value; and a priority instructor that instructs the power generation controller to prioritize the first control as compared with the second control when the first control and the second control collide with each other. According to this aspect, when the first control and the second control collide with each other, it is possible to determine the control contents without performing complicated arbitration and the like. Furthermore, by prioritizing the first control over the second control, conditions which should be further avoided can be avoided.

In the aspect described above, the power generation controller may further perform third control in which for at least one of an anode and a cathode, a stoichiometric ratio is prevented from falling below a predetermined value, and the priority instructor may instruct the power generation controller to prioritize the second control over the third control when the second control and the third control collide with each other. According to this aspect, when the second control and the third control collide with each other, it is possible to determine the control contents without performing complicated arbitration and the like.

In the aspect described above, the fuel cell system may further include a plurality of control devices that communicate with each other, where the plurality of control devices may allocate and perform the power control, the voltage control, the current control, the second control and the third instruction. According to this aspect, when the control devices allocate and perform the control, the aspect described above can be applied.

In the aspect described above, the power generation controller may perform, as the first control, at least two of the power control, the voltage control and the current control, and the power generation controller may include: a first control unifier that unifies values used in the first control among the upper limit value of the generated power, the lower limit value of the generated voltage and the upper limit value of the generated current into the same physical quantity; and a selector that selects, as a limitation value in the first control, a value for realizing the first control among the values after the unification. In this aspect, the first control can easily be realized.

In the aspect described above, the power generation controller may include a second control unifier that unifies the upper limit value of the generated voltage into the physical quantity, and when a limitation value unified by the second control unifier collides with the limitation value selected by the selector, the priority instructor may determine that the first control and the second control collide with each other. According to this aspect, it can easily be determined that the first control and the second control collide with each other.

In the aspect described above, the physical quantity may be current. In this aspect, it can easily be determined that the first control and the second control collide with each other.

The present invention can be realized in various aspects other than the aspects described above. For example, the present invention can be realized in aspects such as a method of controlling a fuel cell, a control device that realizes this method, a computer program for realizing this method and a permanent storage medium that stores this computer program, and the like.

BRIEF DESCRIPTION OF DRAWINGS

FIG. 8 is a table for the application of priority rules.

DESCRIPTION OF THE EMBODIMENTS

Figure 1:
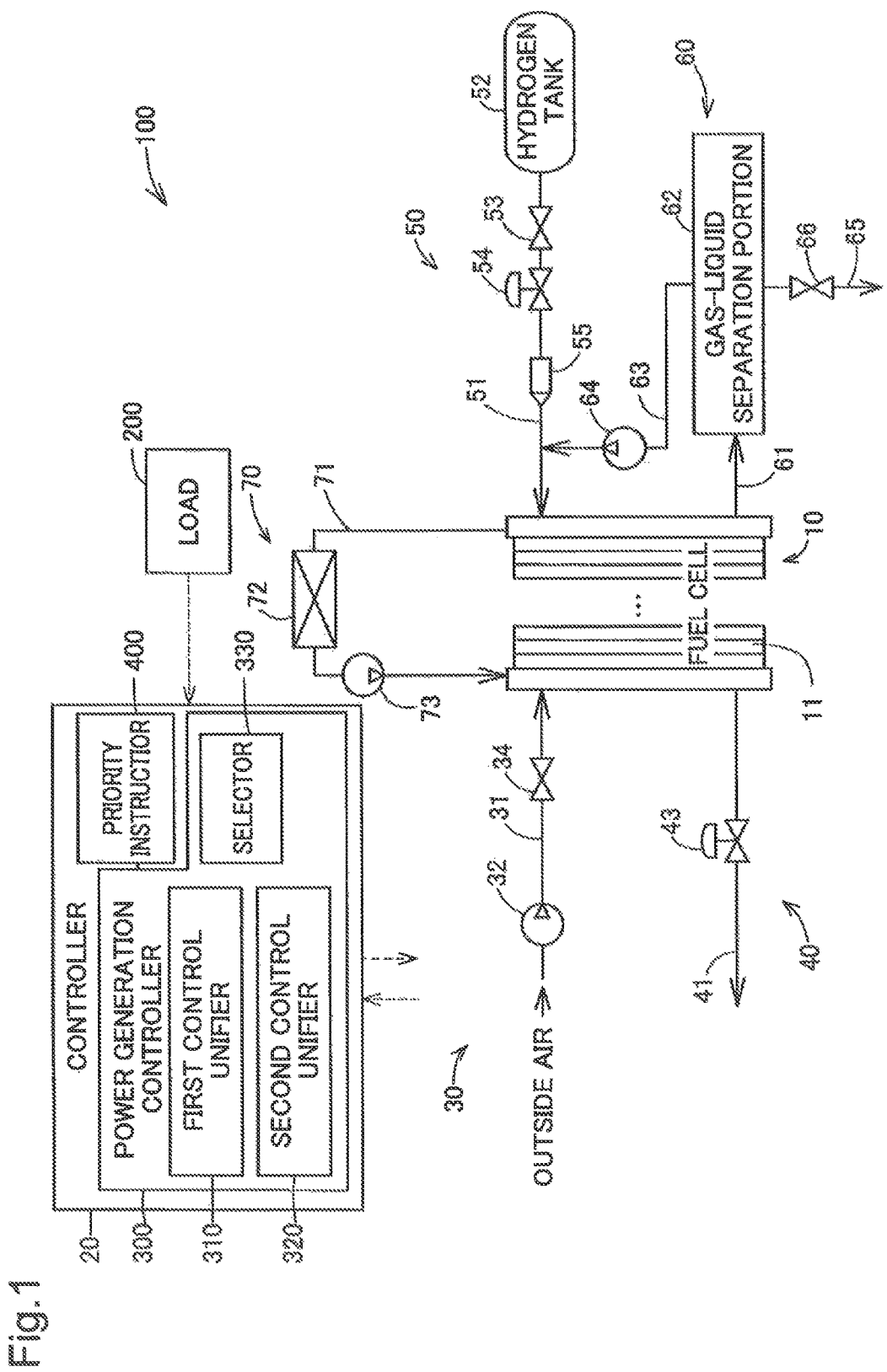
FIG. 1 is a schematic diagram showing a configuration of a fuel cell system.

FIG. 1 is a schematic diagram showing a configuration of a fuel cell system 100. The fuel cell system 100 includes a fuel cell 10, a controller 20, a cathode gas supply portion 30, a cathode gas discharge portion 40, an anode gas supply portion 50, an anode gas circulation discharge portion 60 and a coolant supply portion 70.

The fuel cell 10 is a solid polymer-type fuel cell that receives the supply of hydrogen (anode gas) and air (cathode gas) serving as reaction gases to perform power generation. The fuel cell 10 has a stack structure in which a plurality of (for example, 400) cells 11 are stacked in layers. Each of the cells 11 includes a membrane electrode joint member that is a power generation member in which electrodes are arranged on both surfaces of an electrolyte membrane, and two separators that sandwich the membrane electrode joint member.

The electrolyte membrane is formed with a solid polymer thin film that indicates satisfactory proton conductivity in a wet state. The electrode is formed of carbon. On the surface on the electrolyte membrane side of the electrode, a platinum catalyst for facilitating a power generation reaction is carried. In each of the cells 11, a manifold (not shown) for the reaction gas and the coolant is provided. The reaction gas in the manifold is supplied through a gas flow path provided in each of the cells 11 to the power generation region of each of the cells 11.

The controller 20 includes a power generation controller 300 and a priority instructor 400. The power generation controller 300 includes a first control unifier 310, a second control unifier 320 and a selector 330. The controller 20 receives a power generation requirement from a load 200, controls, according to the requirement, the individual constituent portions of the fuel cell system 100 which will be described below and thereby realizes the power generation with the fuel cell 10.

The cathode gas supply portion 30 includes a cathode gas pipe 31, an air compressor 32 and an opening/closing valve 34. The cathode gas pipe 31 is a pipe that is connected to the cathode side of the fuel cell 10. The air compressor 32 is connected to the fuel cell 10 through the cathode gas pipe 31, takes in outside air and supplies the compressed air to the fuel cell 10 as the cathode gas. The controller 20 drives the air compressor 32 to control the amount of air supplied to the fuel cell 10 either by associating it with power supply to the load 200 or independently of the power supply.

The opening/closing valve 34 is provided between the air compressor 32 and the fuel cell 10, and is opened or closed according to the flow of the supplied air in the cathode gas pipe 31. Specifically, the opening/closing valve 34 is normally closed, and is opened when the air compressor 32 supplies air having a predetermined pressure to the cathode gas pipe 31.

The cathode gas discharge portion 40 includes a cathode exhaust gas pipe 41 and a pressure adjustment valve 43. The cathode exhaust gas pipe 41 is a pipe that is connected to the cathode side of the fuel cell 10, and discharges a cathode exhaust gas to the outside of the fuel cell system 100. The pressure adjustment valve 43 adjusts the pressure (the back pressure of the fuel cell 10) of the cathode exhaust gas in the cathode exhaust gas pipe 41.

The anode gas supply portion 50 includes an anode gas pipe 51, a hydrogen tank 52, an opening/closing valve 53, a regulator 54 and an injector 55. The hydrogen tank 52 is connected to the anode of the fuel cell 10 through the anode gas pipe 51, and supplies hydrogen filled in the tank to the fuel cell 10.

The opening/closing valve 53, the regulator 54 and the injector 55 are provided in the anode gas pipe 51 in this order from the upstream side (that is, the side close to the hydrogen tank 52). The opening/closing valve 53 is opened or closed by an instruction from the controller 20 to control the flow of hydrogen from the hydrogen tank 52 into the upstream side of the injector 55. The regulator 54 is a pressure reduction value for adjusting the pressure of hydrogen on the upstream side of the injector 55.

The injector 55 is an electromagnetically driven opening/closing valve in which a valve member is electromagnetically driven according to a drive period and a valve opening time set by the controller 20. The controller 20 controls the drive period and the valve opening time of the injector 55 to control the amount of hydrogen supplied to the fuel cell 10.

The anode gas circulation discharge portion 60 includes an anode exhaust gas pipe 61, a gas-liquid separation portion 62, an anode gas circulation pipe 63, a hydrogen circulation pipe 64, an anode drain pipe 65 and a drain valve 66. The anode exhaust gas pipe 61 is a pipe that connects the outlet of the anode of the fuel cell 10 to the gas-liquid separation portion 62, and guides an anode exhaust gas containing unreacted gases (hydrogen, nitrogen and the like) which are not used in the power generation reaction to the gas-liquid separation portion 62.

The gas-liquid separation portion 62 is connected to the anode gas circulation pipe 63 and the anode drain pipe 65. The gas-liquid separation portion 62 separates gas components and moisture contained in the anode exhaust gas, guides the gas components to the anode gas circulation pipe 63 and guides the moisture to the anode drain pipe 65.

The anode gas circulation pipe 63 is connected to the downstream side of the injector 55 of the anode gas pipe 51. In the anode gas circulation pipe 63, the hydrogen circulation pipe 64 is provided, and through the hydrogen circulation pipe 64, the hydrogen contained in the gas components separated in the gas-liquid separation portion 62 is fed out to the anode gas pipe 51. As described above, in the fuel cell system 100, the hydrogen contained in the anode exhaust gas is circulated and is supplied again to the fuel cell 10, with the result that the efficiency of utilization of hydrogen is enhanced.

The anode drain pipe 65 is a pipe for discharging the moisture separated in the gas-liquid separation portion 62 to the outside of the fuel cell system 100. The drain valve 66 is provided in the anode drain pipe 65, and is opened or closed according to an instruction from the controller 20. The controller 20 normally closes the drain valve 66 while the fuel cell system 100 is being operated, and opens the drain valve 66 at predetermined drain timing previously set or at timing at which an inert gas in the anode exhaust gas is discharged.

The coolant supply portion 70 includes a coolant pipe 71, a radiator 72 and a coolant circulation pump 73. The coolant pipe 71 is a pipe that couples a coolant inlet manifold and a coolant outlet manifold provided in the fuel cell 10, and circulates the coolant for cooling the fuel cell 10. The radiator 72 is provided in the coolant pipe 71, and performs heat exchange between the coolant flowing through the coolant pipe 71 and the outside air to cool the coolant.

The coolant circulation pump 73 is provided in the coolant pipe 71 on the downstream side (the coolant inlet side of the fuel cell 10) of the radiator 72, and feeds out the coolant cooled in the radiator 72 to the fuel cell 10.

Figure 2:
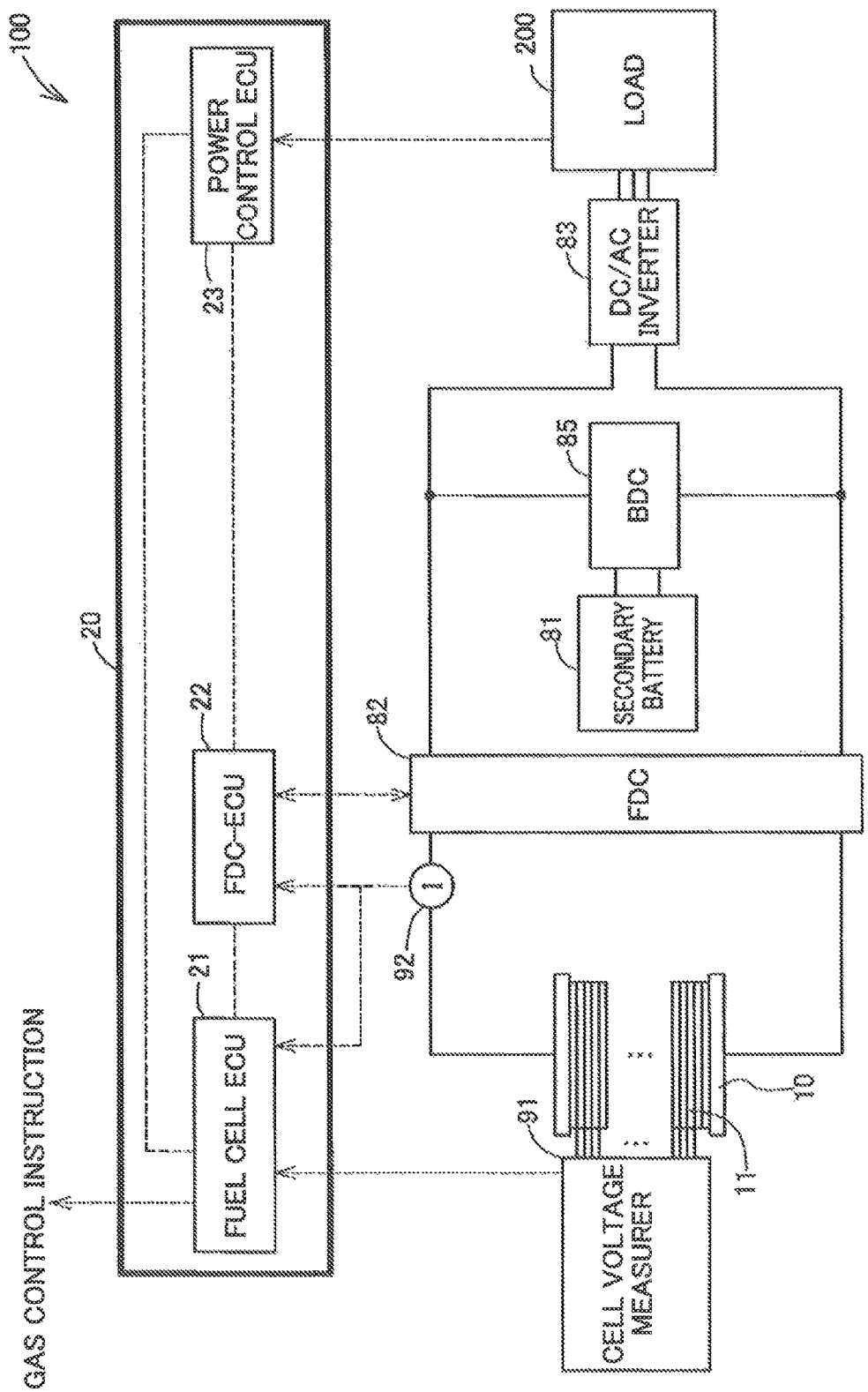
FIG. 2 is a schematic diagram showing an electrical configuration of the fuel cell system.

FIG. 2 is a schematic diagram showing an electrical configuration of the fuel cell system 100. The fuel cell system 100 includes, in addition to the controller 20 and the like described previously, a secondary battery 81, an FDC 82, a DC/AC converter 83, a BDC 85, a cell voltage measurer 91 and a current measurer 92. The controller 20 includes a fuel cell ECU 21, an FDC-ECU 22 and a power control ECU 23. The fuel cell ECU 21, the FDC-ECU 22 and the power control ECU 23 communicate with each other through buses according to a communication protocol such as a CAN.

The cell voltage measurer 91 is connected to each of the cells 11 of the fuel cell 10, and measures the voltage (cell voltage) of each of the cells 11. The cell voltage measurer 91 transmits the results of the measurements to the fuel cell ECU 21. The current measurer 92 measures the value of a generated current by the fuel cell 10, and transmits it to the fuel cell ECU 21 and the FDC-ECU 22.

The power control ECU 23 acquires a required power value from the load 200, and reflects it on the operation of the fuel cell 10. The fuel cell ECU 21 controls the anode gas and the cathode gas based on the required power value, the cell voltage and the generated current. Specifically, the fuel cell ECU 21 controls the operations of the opening/closing valve 53, the hydrogen circulation pipe 64, the drain valve 66 and the like to control the flow rate of the anode gas, and controls the number of revolutions of the air compressor 32 and the like to control the flow rate of the cathode gas and the like.

The FDC 82 and the BDC 85 are DC/DC converters. The FDC 82 controls, based on control by the FDC-ECU 22, the generated current and the generated voltage by the fuel cell 10, and changes the generated voltage to supply it to the DC/AC converter 83. Furthermore, the FDC 82 measures the generated voltage to transmit it to the FDC-ECU 22. The BDC 85 controls the charging and discharging of the secondary battery 81 based on control by another ECU (not illustrated) included in the controller 20. The secondary battery 81 is formed with a lithium-ion battery, and functions as an auxiliary power supply of the fuel cell 10.

The DC/AC converter 83 is connected to the fuel cell 10 and the load 200. The DC/AC converter 83 converts direct-current power obtained by the fuel cell 10 and the secondary battery 81 into alternating-current power, and supplies it to the load 200. Regenerative power produced in the load 200 is converted by the DC/AC converter 83 into a direct current, and is charged by the BDC 85 in the secondary battery 81.

Figure 3:
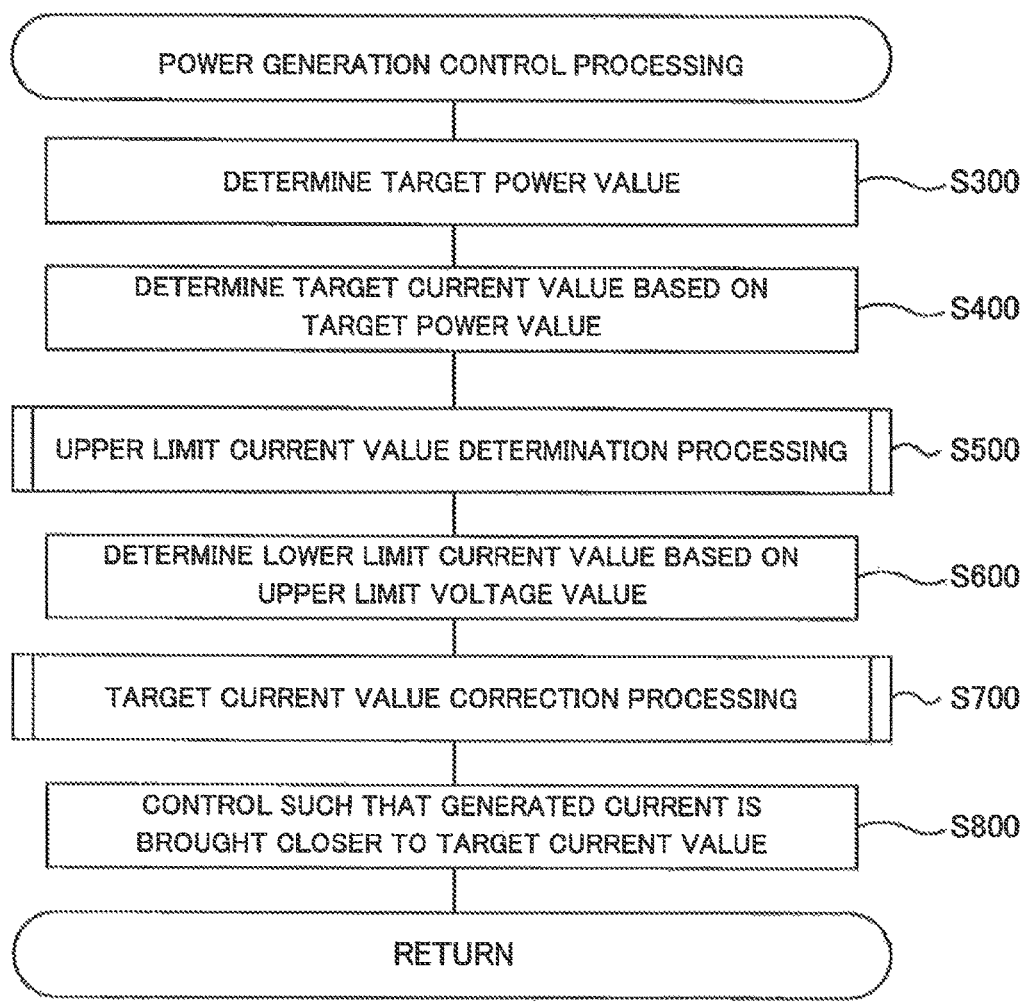
FIG. 3 is a flowchart showing power generation control processing.
Figure 6:
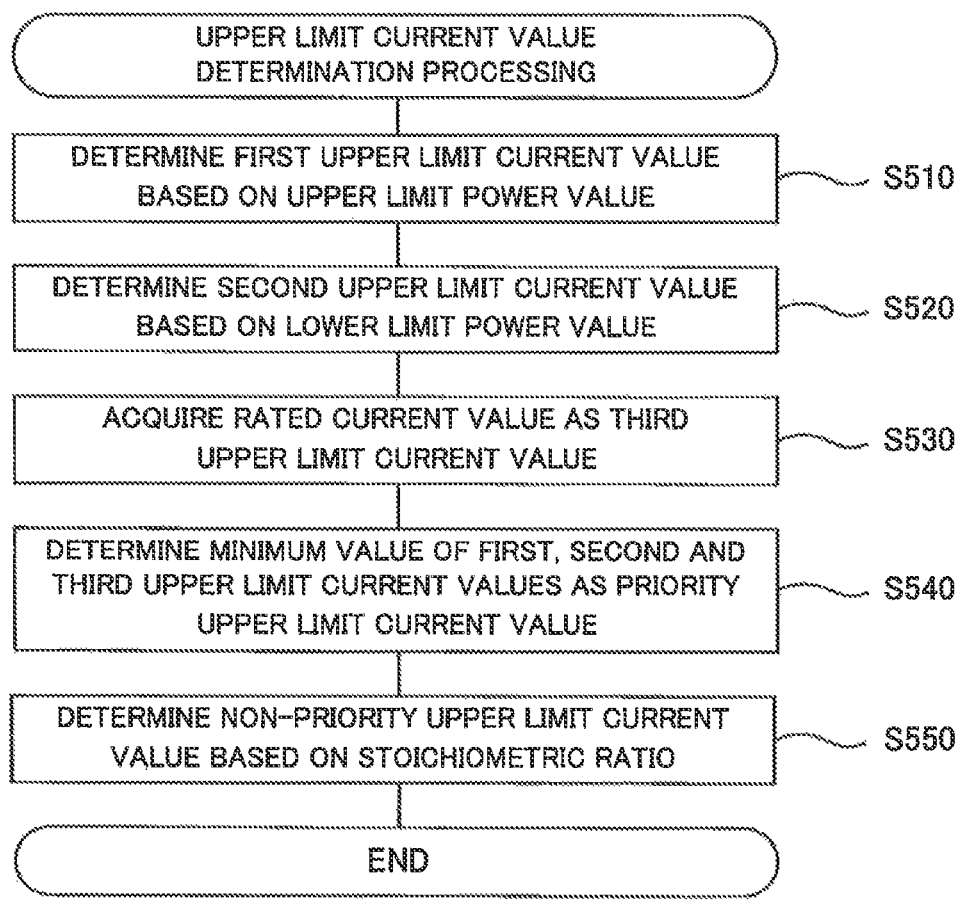
FIG. 6 is a flowchart showing upper limit current value determination processing.
Figure 7:
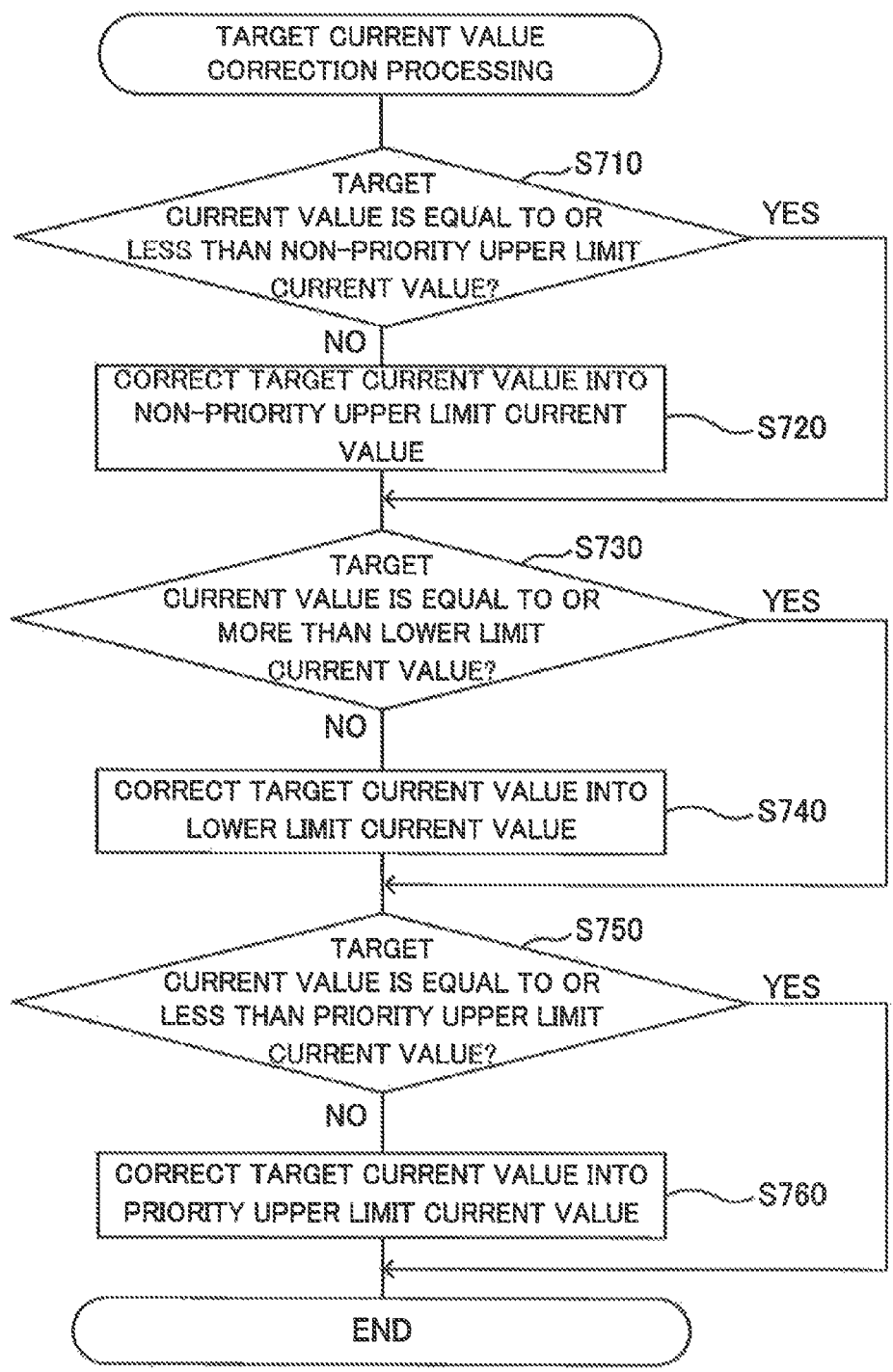
FIG. 7 is a flowchart showing target current value correction processing.

FIG. 3 is a flowchart showing power generation control processing. The power generation control processing is performed in a coordinated manner by the fuel cell ECU 21, the FDC-ECU 22 and the power control ECU 23, and is repeatedly performed while power is being generated by the fuel cell 10. In FIG. 3 and FIGS. 6 and 7, which will be described later, each of the steps that are allocated and performed by the three ECUs are shown as a series of flowchart.

The power control ECU 23 first determines a target power value Ptgt based on the required power from the load 200 (step S300). Then, the fuel cell ECU 21 determines a target current value Itgt based on the target power value Ptgt (step S400).

Figure 4:
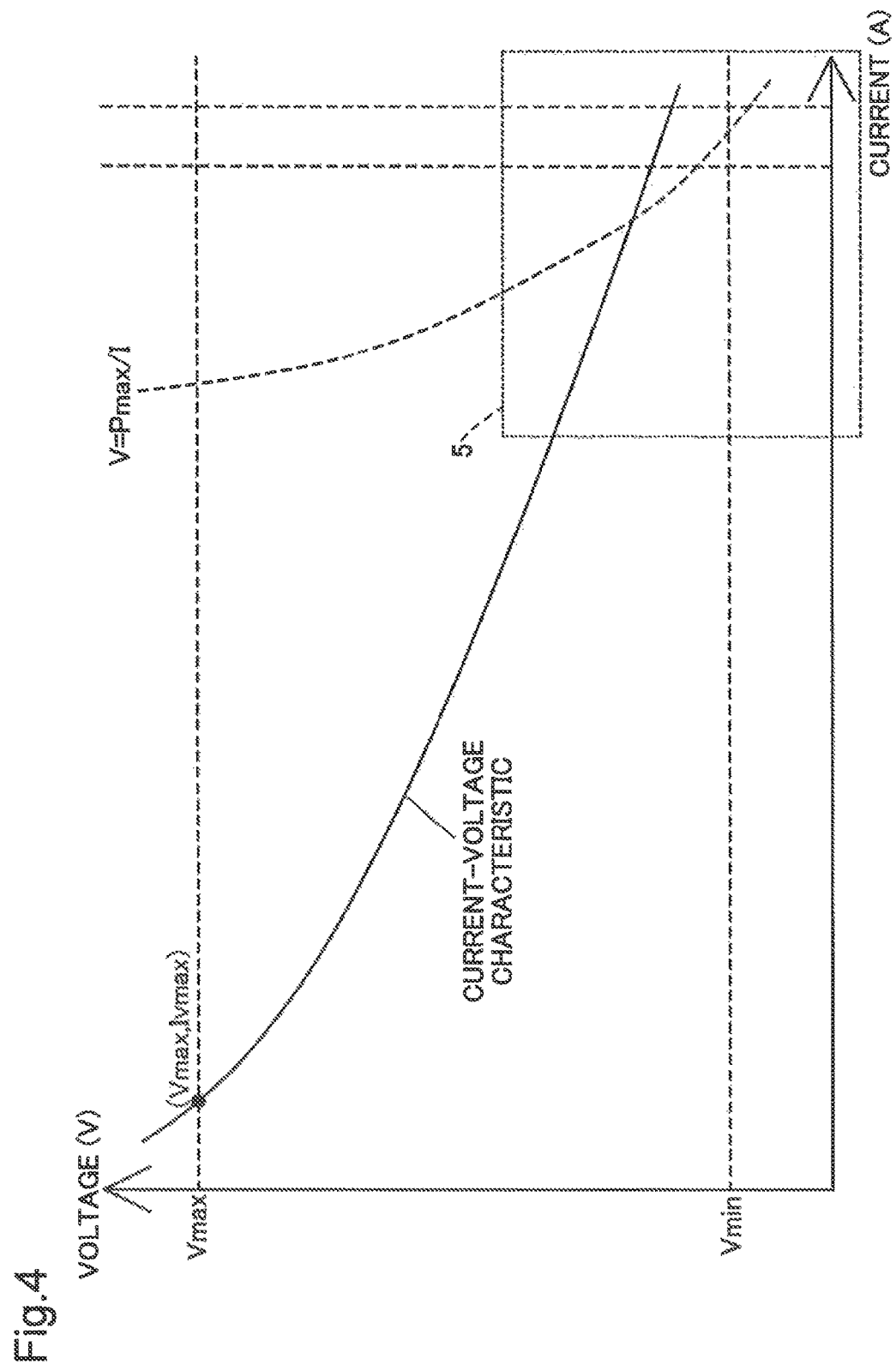
FIG. 4 is a graph showing a current-voltage characteristic.
Figure 5:
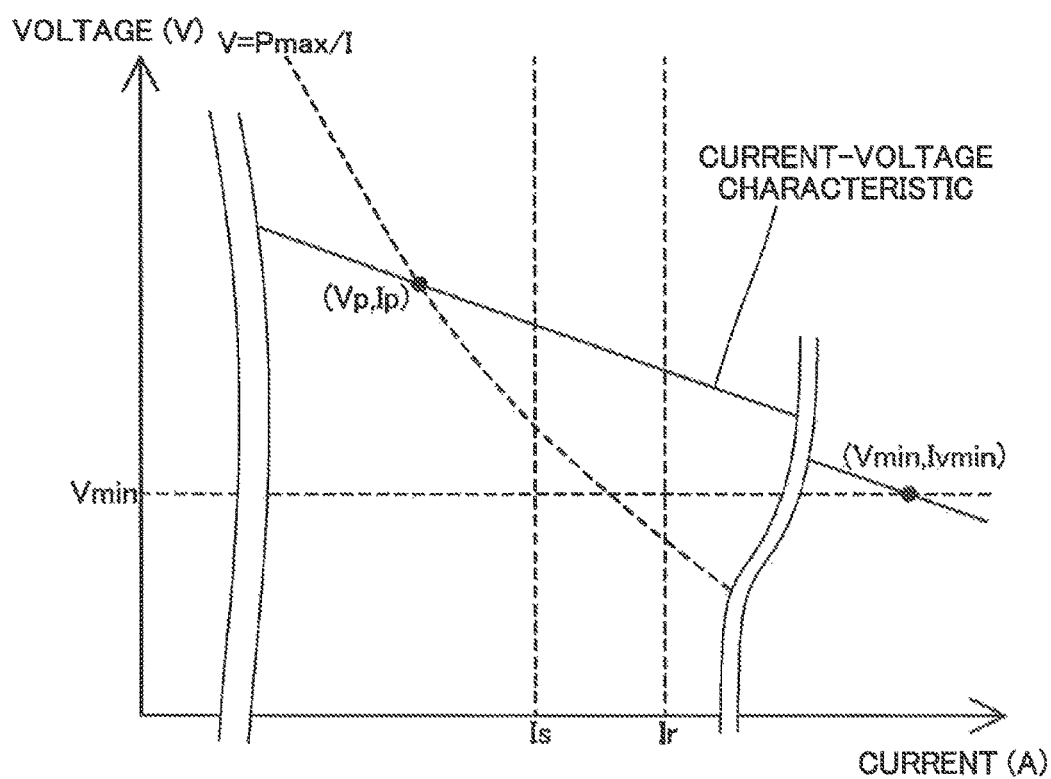
FIG. 5 is an enlarged view of the above graph.

FIG. 4 is a graph showing a current-voltage characteristic of the fuel cell 10. Specifically, this graph corresponds to a graph that is obtained by multiplying the vertical axis and the horizontal axis of a graph showing a current-voltage characteristic of one cell 11 by the number of cells 11 included in the fuel cell 10. FIG. 5 is an enlarged view of a region 5 shown in FIG. 4. Power (W) is calculated as the product of current (A) and voltage (V). In step S400, a current value at an intersection (not illustrated) between a curve (hereinafter referred to as a "characteristic curve") showing a current-voltage characteristic and V=Ptgt/I is determined as the target current value Itgt.

Then, upper limit current value determination processing is performed (step S500). The controller 20 realizes the first control by performing the upper limit current value determination processing. FIG. 6 is a flowchart showing the upper limit current value determination processing. The power control ECU 23 first determines a first upper limit current value based on an upper limit power value Pmax (step S510). The power control ECU 23 realizes power control by performing step S510. The power control ECU 23 performs step S510 to function as the power generation controller 300 and the first control unifier 310. The upper limit power value Pmax is a variable that is determined by the power control ECU 23. For example, the determination of the upper limit power value Pmax is performed in order to protect the secondary battery 81. The secondary battery 81 may be degraded by being charged by a large amount of power or by being excessively charged.

In step S510, a first upper limit current value Imax1 is determined by formula (4) below. In the following formulas, Pj represents an actual measured value of power, Vj represents an actual measured value of voltage and Itgtold represents an immediate target current value.

$$\Delta P = P_j - P\max \quad (1)$$

$$\Delta I = -\Delta P/V_j \quad (2)$$

$$I\max 1 = Itg\text{told} + \Delta I \quad (3)$$

$$\therefore I\max 1 = Itg\text{told} - \{(P_j - P\max)/V_j\} \quad (4)$$

Then, the FDC-ECU 22 determines a second upper limit current value based on a lower limit voltage value Vmin (step S520). The FDC-ECU 22 performs step S520 to realize voltage control. The FDC-ECU 22 performs step S520 to function as the power generation controller 300 and the first control unifier 310. The lower limit voltage value Vmin is a value that indicates the lower limit value of the cell voltage, and is a variable that is determined by the fuel cell ECU 21. For example, the determination of the lower limit voltage value Vmin is performed so as to protect the fuel cell 10 and prevent the power generation efficiency from being lowered. When the cell voltage is excessively low, the temperature of the fuel cell 10 may be excessively increased. When the cell voltage is excessively low, it may enter the operation region in which as the cell voltage is lowered, generated power is lowered, and thus the power generation efficiency may be lowered. In step S520, a second upper limit current value Imax2 is determined by formula (8) below. In the following formula, G1 represents a positive gain.

$$\Delta V = V\min - V_j \quad (5)$$

$$\Delta I = -\Delta V \times G1 \quad (6)$$

$$I\max 2 = Itg\text{told} + \Delta I \quad (7)$$

$$\therefore I\max 2 = Itg\text{told} - \{(V\min - V_j) \times G\} \quad (8)$$

Then, the FDC-ECU 22 acquires a rated current Ir as a third upper limit current value Imax3 (step S530). The FDC-ECU 22 performs step S530 to realize current control. The FDC-ECU 22 performs step S530 to function as the power generation controller 300 and the first control unifier 310. The rated current Ir is a predetermined fixed value (for example, 500 A) so as to protect individual components through which current flows, and is stored in the FDC-ECU 22.

Then, the FDC-ECU 22 determines the minimum value of the first, second and third upper limit current values Imax1, Imax2 and Imax3 as a priority upper limit current value ImaxA (step S540). The FDC-ECU 22 performs step S540 to select the minimum value of the first, second and third upper limit current values Imax1, Imax2 and Imax3. Hence, the FDC-ECU 22 performs step S540 to function as the selector 330. The current value is controlled to be equal to or less than the priority upper limit current value ImaxA, and thus all the limitations by the first, second and third upper limit current values are satisfied. In other words, it is possible to satisfy all the following limitations: the generated power does not exceed the upper limit power value Pmax; the generated voltage does not fall below the lower limit voltage value Vmin; and the generated power does not exceed the rated current Ir.

Then, the fuel cell ECU 21 determines a non-priority upper limit current value ImaxB based on a stoichiometric ratio (step S550), and completes the upper limit current value determination processing. The fuel cell ECU 21 performs step S550 to realize third control. The fuel cell ECU 21 performs step S550 to function as the power generation controller 300. The non-priority upper limit current value ImaxB is a variable that is determined by the fuel cell ECU 21. As the generated current is increased, the flow rates necessary for the anode gas and the cathode gas are increased. However, there are upper limits of the flow rates for the anode gas and the cathode gas. Hence, when the generated current is excessively increased, the stoichiometric ratio falls below a normal range. In step S550, in order to avoid such a situation, the upper limit value of the generated current is determined so as to prevent the stoichiometric ratio from being excessively decreased. The upper limit value is indicated as a current value is in FIG. 5.

Then, as shown in FIG. 3, the FDC-ECU 22 determines a lower limit current value Imin based on an upper limit voltage value Vmax (step S600). The FDC-ECU 22 performs step S600 to realize second control. The FDC-ECU 22 performs step S600 to function as the power generation controller 300 and the second control unifier 320. Specifically, the lower limit current value Imin is determined by formula (12) below. The upper limit voltage value Vmax is a variable that is determined by the fuel cell ECU 21, and for example, a value for suppressing the degradation of the cells 11 is adopted. In the following formula, G2 represents a positive gain. G2 may be same as or different from G1.

$$\Delta V = Vj - V\max \quad (9)$$

$$\Delta I = \Delta V \times G2 \quad (10)$$

$$I\min = Itgtold + \Delta I \quad (11)$$

$$\therefore I\min = Itgtold + \{(Vj - V\max) \times G2\} \quad (12)$$

Then, the FDC-ECU 22 performs target current value correction processing (step S700). FIG. 7 is a flowchart showing the target current value correction processing. Whether the target current value Itgt is equal to or less than the non-priority upper limit current value ImaxB is determined (step S710). When the target current value Itgt exceeds the non-priority upper limit current value ImaxB (no in step S710), a correction is made such that the target current value Itgt coincides with the non-priority upper limit current value ImaxB (step S720). On the other hand, when the target current value Itgt is equal to or less than the non-priority upper limit current value ImaxB (yes in step S710), step S720 is skipped.

Then, whether the target current value Itgt is equal to or more than the lower limit current value Imin is determined (step S730). In other words, whether or not the second control collides with the third control is determined. When the target current value Itgt is less than the lower limit current value Imin (no in step S730), it is determined that the second control collides with the third control. Hence, when the target current value Itgt is less than the lower limit current value Imin (no in step S730), a correction is made such that the target current value Itgt becomes equal to the lower limit current value Imin (step S740). On the other hand, when the target current value Itgt is equal to or more than the lower limit current value Imin (yes in step S730), step S740 is skipped.

Then, whether the target current value Itgt is equal to or less than the priority upper limit current value ImaxA is determined (step S750). In other words, whether or not the first control collides with the second control is determined. When the target current value Itgt exceeds the priority upper limit current value ImaxA (no in step S750), it is determined that the first control collides with the second control. Hence, when the target current value Itgt exceeds the priority upper limit current value Imax (no in step S750), a correction is made such that the target current value Itgt coincides with the priority upper limit current value ImaxA (step S760), and the target current value correction processing is completed. On the other hand, when the target current value Itgt is equal to or less than the priority upper limit current value ImaxA (yes in step S750), step S760 is skipped, and the target current value correction processing is completed.

Finally, as shown in FIG. 3, the FDC-ECU 22 controls the FDC 82 such that the generated current is made close to the target current value Itgt (step S800). In other words, the target current value Itgt in the stage of step S800 and the voltage value corresponding to the target current value Itgt are adopted as the operation point of the fuel cell 10. The FDC-ECU 22 performs S800 to function as the power generation controller 300. That step S760 is performed corresponds to that the power generation controller 300 functioned by the performance of step S800 is instructed to prioritize the first control over the second control. In other words, the FDC-ECU 22 functions as the priority instructor 400 by the performance of step S760. When step S760 is not performed, the performance of step S740 corresponds to the instruction of prioritizing the second control over the third control with respect to the power generation controller 300 functioned by the performance of step S800. In other words, when step S760 is not performed, the FDC-ECU 22 functions as the priority instructor 400 by the performance of step S740.

In the power generation control processing described above, it is possible to determine the control contents without performing complicated arbitration and the like for the limitations of the generated power, the generated voltage and the generated current. The determination can be easily performed as described above because the limitation values (the upper limit value and the lower limit value) are unified into currents and are compared and that furthermore, when the limitation values collide with each other, priority rules are applied. The priority rules mean the contents realized by the target current value correction processing (FIG. 7). Specifically, the highest priority is that the current value does not exceed the priority upper limit current value ImaxA (steps S750 and S700), the second highest priority is that the current value does not fall below the lower limit current value Imin (steps S730 and S740), and subsequent to these two conditions is that the current value does not exceed the non-priority upper limit current value ImaxB (steps S710 and S720).

For example, it is assumed that a current value Ip at an intersection between the characteristic curve and V=Pmax/I (FIGS. 4 and 5) coincides with the priority upper limit current value ImaxA, that a current value Ivmax at an intersection between the characteristic curve and V=Vmax coincides with the lower limit current value Imin and that the current value Ip is more than the lower limit current value Imin. In this case, control is performed such that the generated current falls within a range equal to or more than the current vale Imax and equal to or less than the current value Ip, and thus it is possible to perform control such that all the requirements of the priority upper limit current value ImaxA, the non-priority upper limit current value ImaxB and the lower limit current value Imin are satisfied. For example, when the target current value Itgt (hereinafter referred to as an "initial target current value" based on the target power value Ptgt falls within a range equal to or more than the current value Ivmax and equal to or less than the current value Ivmax, the initial current target value is determined to be the target current value Itgt without being processed, with the result that all the requirements are satisfied and that the required power value is also satisfied. On the other hand, when the initial target current value is less than the current value Ivmax, a correction is made such that the target current value Itgt coincides with the current value Ivmax whereas when the initial target current value exceeds the current value Ip, a correction is made such that the target current value Itgt coincides with the current value Ip, with the result that all the requirements are satisfied. In other words, in such a case, since the pieces of control do not collide with each other, the priority rules described above are not applied. Hence, a description of in which case the priority rules are applied will be given.

FIG. 8 shows a table for illustrating the applications of the priority rules. The minimum value, the intermediate value and the maximum value show a magnitude relationship between the priority upper limit current value ImaxA, the non-priority upper limit current value ImaxB and the lower limit current value Imin determined in the power generation control processing, and 6 ways of (a) to (f) shown in FIG. 8 can be considered. It is noted that the intermediate value is not limited to the average value of the minimum value and the maximum value, and means a value that falls within a range equal to or more than the minimum value and equal to or less than the maximum value.

The lower limit value and the upper limit value shown in FIG. 8 indicate a range that can be obtained as the target current value Itgt in step S800. The "applied priority rule" shown in FIG. 8 indicates the priority rule that is applied when the lower limit value and the upper limit value are determined from the magnitude relationship described above.

FIG. 8(a) is applicable to the case illustrated both in FIGS. 4 and 5. In this case, since as described previously, it is sufficient that the target current value Itgt is set equal to or more than the lower limit current value Imin and equal to or less than the priority upper limit current value ImaxA, no priority rule is applicable.

Even in the case of FIG. 8(b), it is sufficient that the target current value Itgt is set equal to or more than the lower limit current value Imin and equal to or less than the non-priority upper limit current value ImaxB, no priority rule is applicable.

In the case of FIG. 8(c), since the lower limit current value Imin is higher than the non-priority upper limit current value ImaxB, these two requirements cannot be satisfied and collide with each other. Hence, the requirement in which the target current value Itgt is set equal to or less than the non-priority upper limit current value ImaxB has a lower priority than the requirement in which the target current value Itgt is set equal to or more than the lower limit current value Imin, and is thus ignored. Consequently, the target current value Itgt is set equal to or more than the lower limit current value Imin and equal to or less than the priority upper limit current value ImaxA.

In the case of FIGS. 8(d) and (e), since the priority upper limit current value ImaxA is lower than the lower limit current value Imin, these two requirements cannot be satisfied and collide with each other. Hence, the requirement in which the target current value Itgt is set equal to or more than the lower limit current value Imin has a lower priority than the requirement in which the target current value Itgt is set equal to or less than the priority upper limit current value ImaxA, and is thus ignored. However, the target current value Itgt is made to coincide with the priority upper limit current value ImaxA so that the target current value Itgt is as close to the lower limit current value Imin as possible. It is noted that in the case of FIGS. 8(d) and (e), the requirement in which the target current value Itgt is set equal to or less than the non-priority upper limit current value ImaxB is satisfied.

In the case of FIG. 8(f), since the priority upper limit current value ImaxA is less than the lower limit current value Imin, the requirement in which the target current value Itgt is set equal to or more than the lower limit current value is ignored, and the target current value Itgt is set equal to or less than the priority upper limit current value ImaxA. On the other hand, since the lower limit current value Imin is higher than the non-priority upper limit current value ImaxB, the requirement in which the target current value Itgt is set equal to or less than the non-priority upper limit current value ImaxB is ignored, and the target current value Itgt is set as high as possible. Consequently, the target current value Itgt is made to coincide with the priority upper limit current value ImaxA.

Setting the target current value Itgt in the range equal to or more than the lower limit value and equal to or less than the upper limit value described as FIGS. 8(a) to (f) is realized by performing the target current value correction processing (FIG. 7) described previously.

In the embodiment described above, even under conditions in which it is impossible to satisfy all the requirements of the priority upper limit current value ImaxA, the non-priority upper limit current value ImaxB and the lower limit current value Imin, it is possible to perform appropriate control without degrading the responsivity.

The present invention is not limited to the embodiment, examples and variations in the present specification, and can be realized in various configurations without departing from the spirit thereof. For example, the technical features of the embodiment, examples and variations corresponding to the technical features in the aspects described in the section of Summary of the Invention can be replaced or combined as necessary so that part or the whole of the problem described previously is solved or part or the whole of the effects described previously is achieved. When the technical features are not described as essential features in the present specification, they can be deleted as necessary. For example, the followings will be illustrated.

The allocating of the power generation control processing may be changed in any way. The allocating of the power generation control processing refers to the allocation of which of the ECUs performs each step in the power generation control processing.

The number of control devices that perform the steps in the power generation control processing may be changed in any way. For example, one ECU may perform all the steps or two or four or more ECUs may perform them in a coordinated manner.

Without consideration given to any one or two of the upper limit power value, the lower limit voltage value and the rated current value, the priority upper limit current value may be determined. Alternatively, a current value for ensuring a stoichiometric ratio equal to or more than a predetermined value may be added to the determination of the priority upper limit current value.

The non-priority upper limit current value may not be determined. In other words, the upper limit value of the target current value may be a value that cannot ensure a stoichiometric ratio equal to or more than a predetermined value.

In the determination of the priority upper limit current value, the non-priority upper limit current value and the lower limit current value, consideration may be given to other parameters. For example, when it is impossible to suppress an increase in the temperature of the fuel cell by cooling with the cooling water, in order to limit the generated current, the temperature of the fuel cell may be added to the determination of the non-priority upper limit current value.

The physical quantity into which the limitation values are unified may not be current. For example, voltage or power may be used.

The limitation values may not be unified into the same physical quantity. For example, a method of utilizing a table may be used. Specifically, a table is previously produced in which when various limitation values and the target power value are substituted, the corrected target power value is output, and is stored in the FDC-ECU 22, and thus it is not necessary to unify the physical quantities.

When two pieces of control collide with each other, instead of ignoring the control having a lower priority, control utilizing a compromise may be performed. For example, when the priority upper limit current value ImaxA is less than the lower limit current value Imin, the target current value may be set equal to or more than ImaxA and equal to or less than Imin. In this case, weighting corresponding to the priority may be performed. In other words, the target current value may be set at a value that is closer to ImaxA having a high priority than to Imin having a low priority.

The contents of the priority rules may be changed. For example, the lower limit current value may be most prioritized. Alternatively, the upper limit current value for ensuring a stoichiometric ratio equal to or more than a predetermined value may be prioritized over the lower limit current value.

The various limitation values (for example, the upper limit power value and the lower limit voltage value) described as variables may be fixed values that are previously determined.

The current value at the intersection between the curve of V=Pmax/I and the characteristic curve may be determined as the first upper limit current value.

The current value at the intersection between V=Vmin and the characteristic curve may be determined as the second upper limit current value.

The current value at the intersection between V=Vmax and the characteristic curve may be determined as the lower limit current value.

The targeted fuel cell does not need to be one for an automobile, and may be mounted on another transportation device (such as a motorcycle or a train) or may be installed.

In the embodiment described above, at least part of the function and processing realized by software may be realized by hardware. Also, at least part of the function and processing realized by hardware may be realized by software. Examples of the hardware that can be used include an integrated circuit, a discrete circuit, a circuit module obtained by combining those circuits and various types of circuits (circuitry).

What is claimed is:

1. A fuel cell system, comprising:
   a fuel cell in which power is generated;
   a cathode gas supply portion that supplies cathode gas to the fuel cell;
   an anode gas supply portion that supplies anode gas to the fuel cell;
   a power generation controller programmed to control the cathode gas supply and the anode gas supply, wherein the power generation controller is programmed to perform:
   first control including performing at least one of
   power control in which generated power is prevented from exceeding an upper limit value,
   voltage control in which generated voltage is prevented from falling below a lower limit value, and
   current control in which generated current is prevented from exceeding an upper limit value, and
   second control in which the generated voltage is prevented from exceeding an upper limit value; and
   a priority instructor that is programmed to instruct the power generation controller to prioritize the first control over the second control when the first control and the second control conflict with each other,
   wherein the power generation controller is further programmed to perform, as the first control, at least two of the power control, the voltage control, and the current control, and
   the power generation controller includes:
   a first control unifier controller that is programmed to unify values used in the first control among the upper limit value of the generated power, the lower limit value of the generated voltage and the upper limit value of the generated current into a same physical quantity; and
   a selector controller that is programmed to select, as a limitation value in the first control, a value for realizing the first control among the values after the unification.

2. The fuel cell system according to claim 1, wherein the power generation controller is further programmed to perform third control in which for at least one of an anode and a cathode, a stoichiometric ratio is prevented from falling below a predetermined value, and
   the priority instructor is further programmed to instruct the power generation controller to prioritize the second control over the third control when the second control and the third control conflict with each other.

3. The fuel cell system according to claim 1, further comprising:
   a plurality of control devices that communicate with each other,
   wherein the plurality of control devices allocate and perform the power control, the voltage control, the current control, the second control, and the instruction from the priority instructor.

4. The fuel cell system according to claim 1,
wherein the power generation controller includes a second control unifier controller that is programmed to unify the upper limit value of the generated voltage into the physical quantity, and
when a limitation value unified by the second control unifier controller conflicts with the limitation value selected by the selector controller, the priority instructor is further programmed to determine that the first control and the second control conflict with each other.

5. The fuel cell system according to claim 1,
wherein the physical quantity is current.

6. A method of controlling power generated by a fuel cell, wherein the fuel cell is supplied with cathode gas from a cathode gas supply portion and anode gas from an anode gas supply portion, the method comprising:
performing first control including performing at least one of
power control in which generated power is prevented from exceeding an upper limit value,
voltage control in which generated voltage is prevented from falling below a lower limit value, and
current control in which generated current is prevented from exceeding an upper limit value;
performing second control in which the generated voltage is prevented from exceeding an upper limit value;
prioritizing the first control over the second control when the first control and the second control conflict with each other,
wherein the performing first control and the performing second control include controlling the cathode gas supply portion and the anode gas supply portion;
performing, as the first control, at least two of the power control, the voltage control, and the current control;
unifying values used in the first control among the upper limit value of the generated power, the lower limit value of the generated voltage, and the upper limit value of the generated current into a same physical quantity; and
selecting, as a limitation value in the first control, a value for realizing the first control among the values after the unification.

7. The control method according to claim 6, further comprising:
performing third control in which for at least one of an anode and a cathode, a stoichiometric ratio is prevented from falling below a predetermined value; and
prioritizing the second control over the third control when the second control and the third control conflict with each other.

8. The control method according to claim 6,
wherein a plurality of control devices that communicate with each other allocate and perform the power control, the voltage control, the current control, and the second control.

9. The control method according to claim 6, further comprising:
determining that the first control and the second control conflict with each other, when a limitation value unified by unifying the upper limit value of the generated voltage into the physical quantity and the selected limitation value conflict with each other.

10. The control method according to claim 6,
wherein the physical quantity is current.

* * * * *